United States Patent
Kao

(10) Patent No.: US 7,046,697 B2
(45) Date of Patent: May 16, 2006

(54) FAST ETHERNET MULTIPORT REPEATER

(75) Inventor: Ron Kao, Saratoga, CA (US)

(73) Assignees: Lite-On Communications Corp., Hsinchu (TW); Lite-On Communications, Inc., Milpitas, CA (US)

(*) Notice: Subject to any disclaimer, the term of this patent is extended or adjusted under 35 U.S.C. 154(b) by 970 days.

(21) Appl. No.: 10/072,937

(22) Filed: Feb. 12, 2002

(65) Prior Publication Data

US 2002/0156957 A1    Oct. 24, 2002

(30) Foreign Application Priority Data

Feb. 13, 2001    (TW) ................ 90103107 A

(51) Int. Cl.
*H04J 3/08*    (2006.01)
*H04J 1/10*    (2006.01)
*H04L 5/14*    (2006.01)
*H04B 7/14*    (2006.01)

(52) U.S. Cl. .................. 370/501; 370/274; 370/279; 370/315; 370/492

(58) Field of Classification Search ................ 370/501, 370/274, 279, 315, 491–492
See application file for complete search history.

(56) References Cited

U.S. PATENT DOCUMENTS

2005/0018704 A1*    1/2005  Voloshin et al. ............ 370/438

* cited by examiner

*Primary Examiner*—Chi Pham
*Assistant Examiner*—Ronald Abelson
(74) *Attorney, Agent, or Firm*—Bacon & Thomas, PLLC

(57) ABSTRACT

The invention combines the repeater functions outlined in the IEEE 802.3 Standards, §27, and the 100BASE-TX PCS and PMA. The disclosed FEMR provides four ports in the PQFR packet of its 100 pins. Such extension ports allow multiple serial connections of the FEMR's, increasing the number of all ports on the repeaters. Therefore, the price of each repeater can be reduced to its minimum, and the serial device does not need an external logic circuit. Additionally, the serial device also supports the extension among built-in inter-repeaters used in stackable backplanes.

5 Claims, 3 Drawing Sheets

FAST ETHERNET MULTIPORT REPEATER

BACKGROUND OF THE INVENTION

1. Field of Invention

The invention relates to a fast networking data device. More particularly, the invention relates to an IEEE 802.3 100BASE-TX FEMR (Fast Ethernet Multiport Repeater).

2. Related Art

The Ethernet is a common communications standard used in an LAN (Local Area Network) for sharing information among computer systems, printers, modems and other data devices. The conventional Ethernet operates at a transmission speed of 10 Mbps. Nowadays, modern networks in the industry have changed to a higher speed: 100 Mbps. However, a wider data transmission bandwidth brings the new problem of message collisions, which strictly limit the area and length of the network.

Both the Ethernet (10 Mbps) and the fast Ethernet (100 Mbps) use an industrial standard method called the CSMA (Carrier Sense Multiple Access) to retrieve data on the network. The CSMA describes how an Ethernet data device detects whether a network line is idle before receiving data from the network.

When two or more devices are transmitting data at the same time, data collisions will occur. To allow the data devices to recover from such situations, the specifications of the Ethernet and the fast Ethernet include a recovery method called the collision detection.

The specifications of the Ethernet or the fast Ethernet limit the length of network lines and the number of repeaters. This is because the network only allows a maximum transmission delay for message packets transmitting from data transmitting-devices to data-receiving devices. Increasing the transmission speed imposes additional limits on the network configuration. Therefore, the network has to have better collision detection ability in order to improve the transmission quality and provide a better network environment.

SUMMARY OF THE INVENTION

A primary objective of the invention is to provide an FEMR for a low-cost system solution to implement an IEEE 802.3 100BASE-TX repeater on a low-cost 100BASE-TX receiver device without the need of MII or any external logic circuit while providing a built-in LED (Light-Emitted Diode) display circuit in multiport device extensions. The invention can further reduce or even potentially eliminate such problems as message collisions.

According to an embodiment of the invention, the invention combines the repeater function described in IEEE802.3 Standards, §27, and the 100BASE-TX PCS (Physical Code Sublayer) and PMA (Physical Medium Attachment). The disclosed FEMR provides four ports in the PQFR packet of its 100 pins. Such extension ports allow multiple serial connections of the FEMR's, increasing the number of all ports on the repeaters. Therefore, the price of each repeater can be reduced to its minimum, and the serial device does not need an external logic circuit. Additionally, the serial device also supports the extension among built-in inter-repeaters used in stackable backplanes.

The FEMR provides a pin for displaying the three states of each port: connection, action and error; another pin for integrity display of collisions; and five pins for displaying utilization/performance. It does not need any external logic circuit to drive the LED's. The disclosed device provides error/fault detection and network utilization/performance display for the convenience of debugging and network performance state without the need for any management software.

BRIEF DESCRIPTION OF THE DRAWINGS

The invention will become more fully understood from the detailed description given hereinbelow, which is by way of illustration only, and thus is not limitative of the present invention, and wherein.

DETAILED DESCRIPTION OF THE INVENTION

The disclosed FEMR (Fast Ethernet Multiport Repeater) provides a low-cost system solution to implement an IEEE 802.3 100BASE-TX repeater on a low-cost 100BASE-TX receiver without the need of MII or any external logic circuit while providing a built-in LED (Light-Emitted Diode) display circuit in multiport device extensions. The extensibility of the FEMR can be implemented by a pending application of an inter-repeater backplane interface. The built-in inter-repeater backplane interface of the FEMR only needs some additional buffer chips. The stackable backplanes can be easily and economically added to the FEMR.

Figure 1:
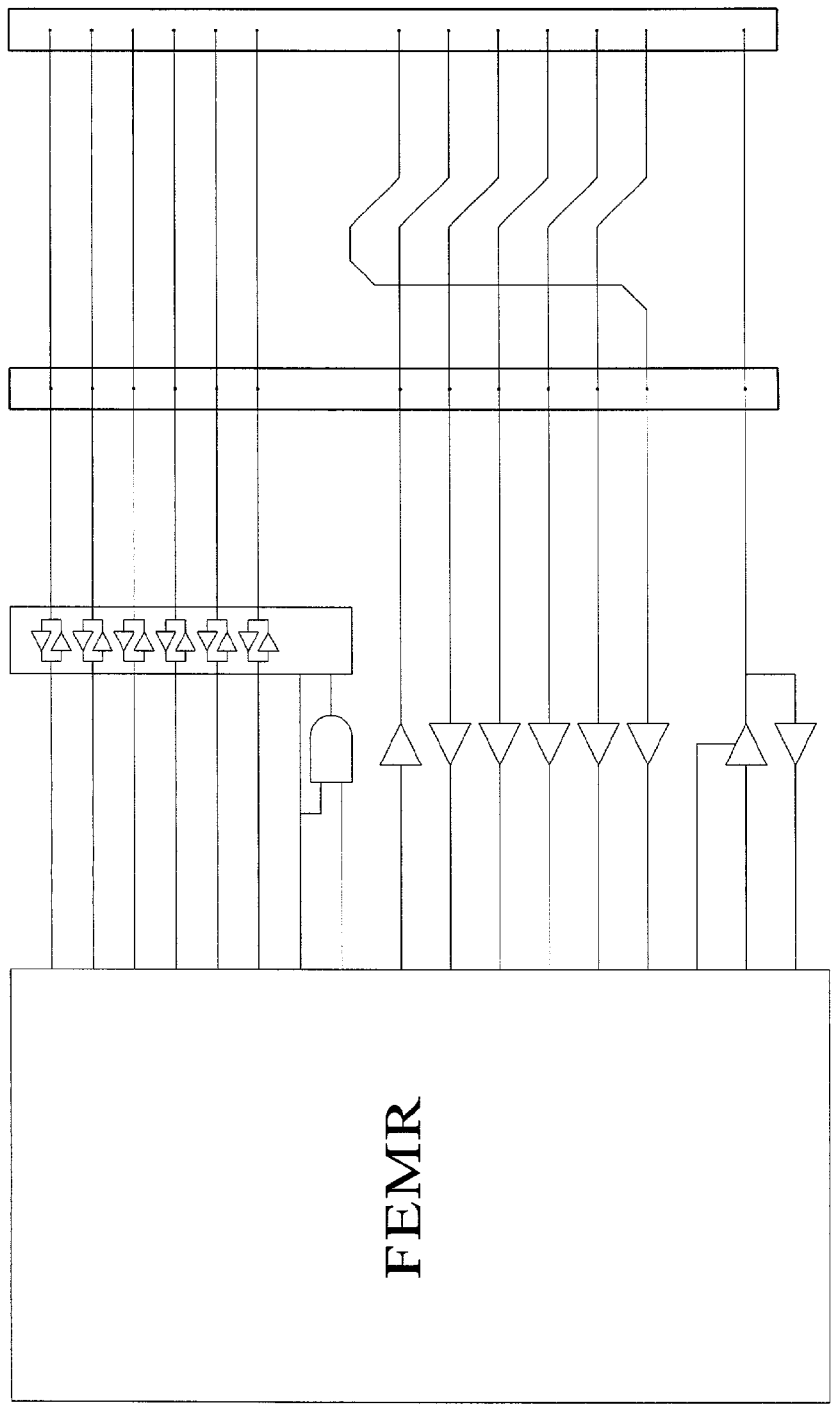
FIG. 1 shows an interface connection diagram of the disclosed FEMR.

In a preferred embodiment of the invention, the FEMR is implemented on a chip or an IC (Integrated Circuit), whose interface signal connection is shown in FIG. 1. The FEMR includes three sets of basic signal groups in the backplane interface: an inter-repeater data and control bus signal, a backplane request bus signal, and a collision detection control signal, respectively.

In the embodiment, the pin number, I/O and further description of the basic signal groups are detailed in Table 1.

TABLE 1

| Signal | Pin # | I/O | Description |
|---|---|---|---|
| IR_DATA[4..0] | 5 | Both | Unencodable 4B/5B decoded in inter-repeater bus. |
| IR_BP_CLOCK | 1 | Both | Inter-repeater backplane pulse, 25 MHz. |
| IR_DOE# | 1 | Output | Controllable inter-repeater data output. |
| IR_DIE# | 1 | Output | Controllable inter-repeater data input. |
| BR_REQ_OUT# | 1 | Output | Backplane request output, low level. |
| BP_REQ_IN#[5..1] | 5 | Input | Backplane request output, low level. |
| BP_COL_OE# | 1 | Output | Controllable backplane collision output. |
| BP_COL_OUT# | 1 | Output | Backplane collision output, low level. |
| BP_COL_IN# | 1 | Input | Backplane collision output, low level. |

IR = Inter-Repeater; BP = Backplane.

IR_DATA[4..0] provide a two-way data path which conveys inter-repeater data from multiple FEMR stack units. Each FEMR stack unit can output decoded 4B/5B encryption data to an IR_DATA bus. Before this, IR_DATA[4..0]

have to successfully perform the BP_REQ_OUT# action for two successive IR_BP pulses, without the need to receive any of the BP_REQ_IN#[5..1] signals. In addition, a repeater backplane collision will happen. After IR_DOE# is driven into action, the IP_DATA[4..0] buses become valid pulses. The multiple FEMR stack units can receive inter-repeater data no matter what the signal action of any of the BP_REQ_IN#[5..1] signals in the units is. The negative edge trigger of the IR_BP pulse will lock IR_DATA[4..0].

IR_BP_CLOCK is a two-way 40 ns 25 Mhzpulse. Aside from IR_BP_CLOCK, it has the same function as IR_DATA [4..0]. It is triggered after IR_DOE# is enabled.

IR_DOE# is always at a low driving level regardless of whether any FEMR stack unit allows IR_DATA[4..0] or not.

IR_DIE# is always at a low driving level regardless of whether any FEMR stack unit can receive IR_DATA[4..0] from other FEMR stack units or not.

BP_REQ_OUT# uses the FEMR stack units to request and obtain IR_DATA[4..0]. To connect to other FEMR stack units along the serial chain, the BP_REQ_OUT# signal is only connected to one BP_REQ_IN#[5..1] at each of the FEMR stack units. If the FEMR stack units need to use inter-repeater buses to repeat packets, it is necessary to successfully drive the signal to a low level using two successive IR_BP pulses. If any of the BP_REQ_IN#[5..1] signals is enabled during this period, collisions will occur on the inter-repeater backplane. Please refer to FIG. 2 for an illustration of the connection of BP_REQ_OUT# to multiple FEMR stack units.

BP_REQ_IN#[5..1] are backplane request inputs. Only one signal is enabled in each FEMR stack unit. In addition, the backplane of the inter-repeater will have message collisions. When any BP_REQ_IN#[5..1] is enabled, the FEMR stack units start to receive data through the IR_DATA[4..0] buses (see FIG. 2).

BP_COL_OE# is an output. It controls the signal of an external open buffer. Regardless of whether the FEMR stack units detect the BP_REQ_IN#[5..1] signals during the action of BP_REQ_OUT#, an inter-repeater backplane uses the signal action to make collisions, allowing the BP_COL_OUT# signal to propagate through the backplane collision bus.

The driving action of BP_COL_OUT# is always at a low level regardless of whether the FEMR stack units detect collisions through the BP_REQ_OUT# and BP_REQ_IN# signals. The signal is operated with BP_COL_OE#.

BP_COL_IN# is a backplane collision signal. Regardless of any of whether the FEMR stack units detects the signal action or not, BP_COL_IN# always knows whether an inter-repeater backplane collision occurs.

The inter-repeater backplane interface used by the invention is completely different from that used in the prior art. Considering cases using other backplane interfaces, the disclosed FEMR transmission has implemented common stack backplanes. Before inter-repeater data are allowed to be sent to the inter-repeater data bus (IR_DATA), the signal handshaking needs the sorting of REQUEST and ACKNOWLEDGE signals. The communications of the REQUEST and ACKNOWLEDGE signals cannot reduce the wait time of inter-repeater start-of-packet and the propagation delay time for collisions down to an optimal one. The disclosed FEMR utilizes a more efficient arbitration scheme, which does not need any confirming communication signal for the data bus of the arbitration repeater. Instead, a parallel detection structure is used between repeater backplane bus requests (BP_REQ) to reduce the data propagation delay in the inter-repeater backplane bus. Each FEMR of the invention has a backplane request output signal BP_REQ_OUT# and five backplane request input signals BP_REQ_IN[5..1] #. Based upon these six arbitration signals, six FEMR stack units are piled together. If there are additional backplane request input signals, more than six FEMR stack units may be combined.

Figure 2:
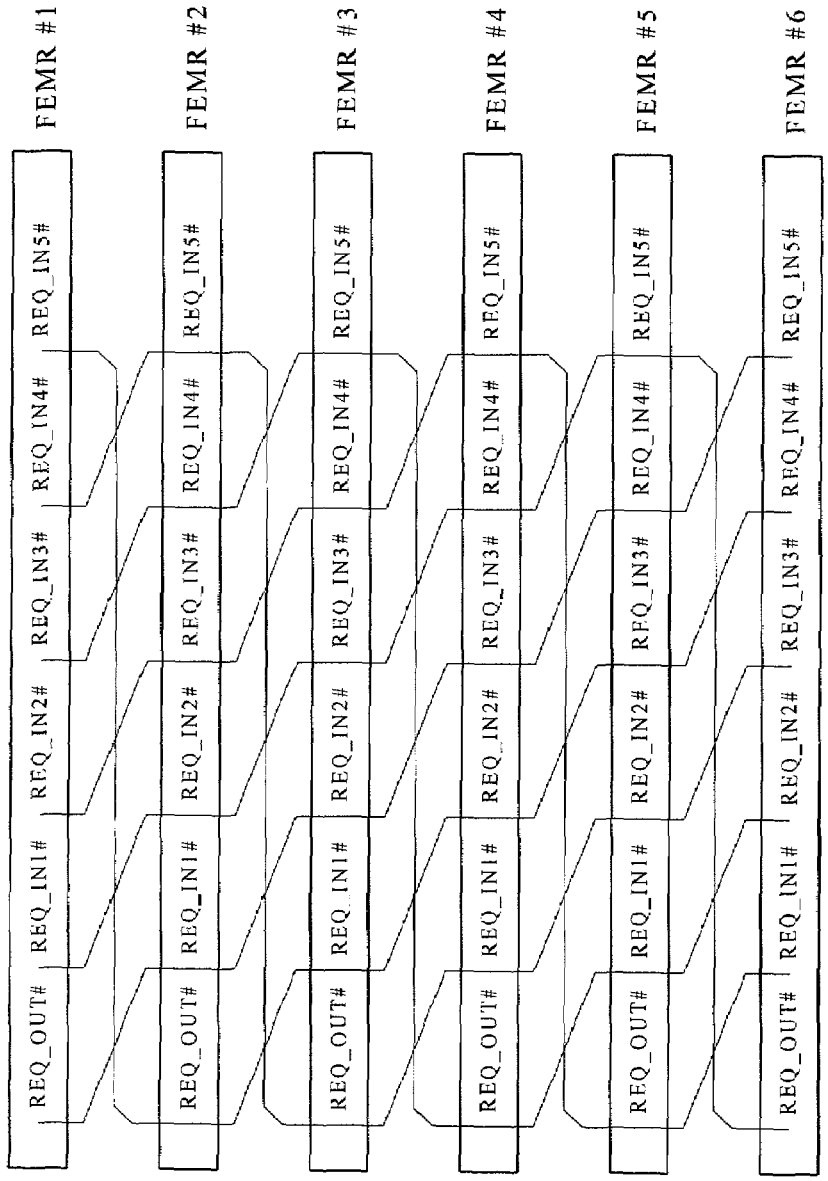
FIG. 2 shows the connection of the repeaters of the invention.

As shown in FIG. 2, the inter-repeater arbitration method of the disclosed FEMR is described as follows:

1. Regardless of whether any FEMR stack requests a repeater bus signal or not, the BP_REQ_OUT# signal has to be enabled. Using the technology of connecting stack backplanes together, the rest of the five FEMR stack units can detect in a parallel manner the request action signals made by the FEMR units.
2. Once the request action signals are detected, the FEMR stack units start to receive emerging data from the FEMR units that make requests.
3. Any of the signals BP_REQ_IN[1..5] also detects request actions at the same time, returning the request from each of the repeater stack units for the inter-repeater bus, and when a backplane collision occurs the rest of the repeater stack units detect the occurrence of the collision through the backplane collision bus.

Based upon the arbitration method of the invention, it is not necessary to use a confirmation signal to obtain repeater backplane data. This greatly reduces the wait time of the start-of-packet and the propagation delay time of collisions, rendering the data conversion of the inter-repeater stack backplanes more efficient.

The backplane of the FEMR device is not connected to any external logic circuit. It provides four 100BASE-TX ports, a local inter-repeater serial port and a stack backplane port. In addition, the FEMR disclosed herein is compliant with the basic repeater functions defined in the IEEE 802.3 100BASE-TX Standards, §24 and §27. Therefore, with regard to the simple and low-cost debugging and thorough network performance display, the additional benefits of error and utilization display can be obtained without the support of network management software. We list the functions that the disclosed FEMR can process and/or achieve as follows:

1. Repeater Function

If a single port of a repeater detects the beginning of a valid packet in its receiving line, the invention sends the received data to all other useful network ports. The repeater data are also provided on IRD lines for the application of multiple FEMR repeaters.

2. Signal Regeneration

When a packet is sent again, the FEMR guarantees that the packet being sent out complies with the structure, voltage and time properties of IEEE802.3 Standards under the premise of FSD.

3. Receiver Jabber Protection

The FEMR chip provides receiver jabber protection to guarantee the integrity of long-term, heavy-duty packet transmissions on the network. If the FEMR has continuously transmitted over 65536 bit time, such a protection automatically repeats the transmission and reception.

4. Collision Processing

The FEMR chip provides collision detection and the response defined in the IEEE 802.3 Standards. The implementation of a multiple FEMR device can also abide by the IEEE 802.3 specification for extension port transmissions. More explicitly, as detailed in the IEEE 802.3 Standards, §27, a repeater is based upon one or several FEMR's to correctly process the transmission collisions and the state of one-port-left.

5. Automatic Partition/Re-connection Processing

For a large amount of collisions, the disclosed FEMR can partition any port. The FEMR still sends out data packets to a partition port but does not react to the receiver on the partition port. Once such a partitioned port encounters a port with specific instructions and in good state, the new port is monitored and reconnected. The specification of the reconnection is also defined in the IEEE 802.3. Aside from the algorithm for reconnection, the DEMR also provides a better partition function selection. Each port is individually partitioned or reconnected. If 60 continuous collisions are detected, the FEMR partitions its network ports. The FEMR will reconnect its partitioned ports when:

a. the transmission or reception time for the data packet on a partitioned port is longer than 128 bit time (normal) and no collision occurs; or b. the power is reset.

6. Connection Monitor Processing

When a 100-BASE-X PMA requires reliable network transmissions, such a connection monitor function is implemented. According to the signal detection of a physical layer device, a state machine implemented in the FEMR for connection monitor processing can control the state of upward or down connections.

7. Carrier Wave Monitor Processing

Each PMA repeater contains a self-disconnection function to prevent error carrier wave transmissions from the repeater unit to the network. The PMA interface continuously counts error carrier wave events. When the error carrier wave counts exceeds a value set confined by FCC or an error carrier wave event lasts longer than a value set of the error carrier wave counts, an unstable connection will be detected.

8. Error Carrier Wave Detection and Invalid Symbol Reception Processing

Each PMA layer can detect one error carrier wave, which defines the symbol beginning (JK) for an appropriate data flow. Each PCS layer can detect invalid symbol groups. Symbols in the symbol group in 100BASE-X are not valid symbols and defines the symbol ending (TK) of inappropriate data flow in any data structure. These two detection results receive errors and transmit error state symbol (H) in the repeaters.

9. Extension Function

The FEMR supports two extension ports: one local extension port for serially connecting to devices on the panel, and the other backplane extension port for serially connecting to the stack panel of a stackable backplane. The local extension port provides a request output (LREQO) for inter-repeater buses to use (IRD[4..0]), six request inputs from other local serial devices, and one open-collection two-way pin for collision propagation. If only a self-request is propagating, the arbitration method built in the FEMR chip will produce a bus writeable signal. If a bus has over one request, a collision signal is sent to the internal circuit. Once the device detects an internal collision or more than one port is receiving signals at the same time, the open-collection two-way pin is forced to a low level. The device also monitors the pin for detecting the inter-repeater collision state. When each serial device and all transmission states have only one I/O, the detection of bus writeable signals and incompatibility/collision detection will simultaneously occur. The delay time is only half the time for performing regularity requests/confirmation arbitration. The backplane extension port provides a backplane request input (BREQO) for the inter-repeater bus to use (IRD[4..0]) and six other backplane request inputs on the backplane stack panel. If there are only self-request transmissions, the backplane extension port arbitration circuit OR all local device requests (LREQS) as BREQO on the backplane and generates a bus writeable signal. If the bus has more than one backplane request (BREQ), incompatible signals about collisions will be produced in the internal circuit. The local detection incompatibility/collision state can be propagated inward to the backplane extension port so that the whole backplane device forms a signal collision area. The parallel requested by the inter-repeater bus reduces the delay in data propagation and thus the wait time of the start-of-packet and the propagation delay of the collisions.

10. LED Display Function

The FEMR provides each port a pin for LED display of connection/action and a pin for LED display of error states. It also provides a pin for the integrity display of the collision state. The connection state is displayed by a static current of the LED. The action state is displayed by an instantaneous current. The FEMR also has additional LED display ability for the network utilization/performance state. Five pins are provided to drive the utilization/performance LED to indicate all utilization and device performance. The LED's are characterized in that the user can conveniently debug using low-cost cables to indicate network traffic without the support of management software.

Figure 3:
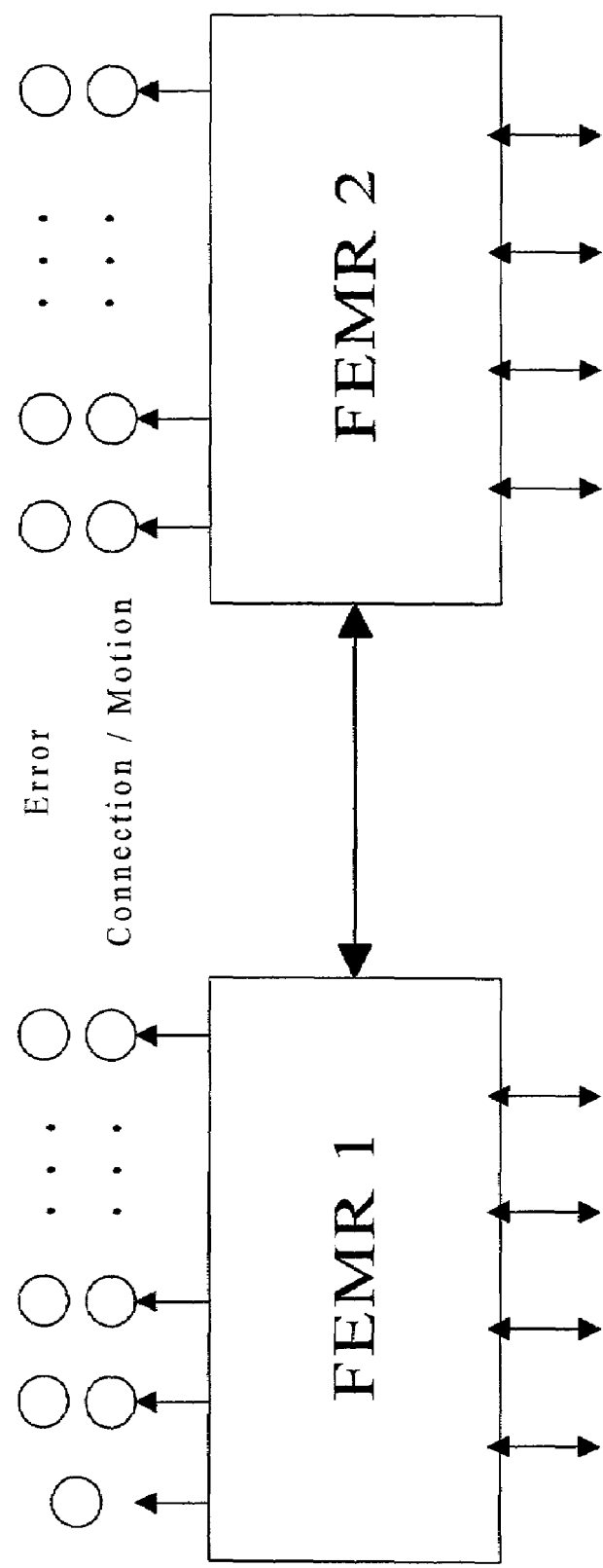
FIG. 3 is a block diagram of the FEMR's and LED's according to the preferred embodiment of the invention.

FIG. 3 shows a preferred embodiment of the invention. According to the embodiment, one can serially connect the disclosed FEMR chips and LED's to achieve a repeater device with more than 144 ports (4 ports/chip×6 chips/panel×6 panel/backplane) and a simple management state display. The serial device connection or LED display does not need any external logic circuit.

Effects of the Invention

According to the FEMR disclosed in this specification, the invention has the following features:

It is compliant with the IEEE 802.3 100BASE-TX repeater unit specifications.

It has consistent interfaces when the TTL/CMOS is under a voltage of 5V from a single power supply.

The delay wait time of the FEMR is short and can be used in the applications of type-I and type-II repeaters.

For repeaters in local serial connections or stack backplane extensions, their extensions can have 12 port panels with more than 6 stacked 72-ports or 24 port panels with more than 6 stacked 144-ports.

It can be used in chip elastic buffers.

It suppresses long-term illegal data reception when unclear self-interruption is received.

Each port can be partitioned to reflect the fact of many collisions or disorder situations.

The carrier wave integrity monitor of the error carrier wave events can be used to avoid an unstable network.

The signal connection state monitor of the PHY device is used to continuously send out connections.

It has error carrier wave detection. Invalid symbol reception triggers an error symbol transmission for signaling an error state.

Each port is provided with connection/action and integrity collision LED displays.

Each port is provided with reception error LED display for easy debugging.

The network utilization/performance LED display is provided without the support of network management software. While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A multiport repeater (MR) for fast Ethernet (100 Mbps) data transmissions, whose inter-repeater backplane interface signals comprise: an inter-repeater data and control bus, a backplane request bus, and a collision detection control signal; the backplane request bus including a request output signal and at least one request input signal for implementing a stack backplane with MR stack units and the connection of the MR arbitration repeater stack units being such that:

the request input signal detects in parallel whether any repeater stack unit makes a request, obtains an inter-repeater bus signal and sends out the request input signal;

once the inter-repeater bus signal is obtained, the repeater stack unit making the request starts to receive emerging data; and any of the request input signals also detects request actions at the same time, returning the request from each of the repeater stack units for the inter-repeater bus, and when a backplane collision occurs the rest of the repeater stack units detect the occurrence of the collision through the backplane collision bus.

2. The multiport repeater of claim 1 providing a local extension port for serially connecting devices on a panel and a backplane extension port for serially connecting a stack panel for stacking backplanes.

3. The multiport repeater of claim 2, wherein the local extension port provides a request output signal for the inter-repeater bus to use, at least one request input signal from other local serial devices, and an open-collection two-way pin for collision propagation; an arbitration method produces a bus writeable signal when there is only a self-request signal; and a collision signal is provided to its internal circuit when more than one request signal exists.

4. The multiport repeater of claim 2, wherein the backplane extension port provides a backplane request output signal for the inter-repeater bus to use and at least one backplane request input signal for other backplane stack panels; the arbitration method OR all local device requests and produces a bus writeable signal; and its internal circuit generates an incompatible signal of collisions when more than one backplane request exists and the local detection incompatibility/collision state is propagated to the backplane extension port so that the backplane device forms a signal collision area.

5. The multiport repeater of claim 1 providing each port a pin for connection/action LED display and each port a pin for error state LED display, and a pin for integrity display of the collision state.

* * * * *